United States Patent [19]

Grothause

[11] Patent Number: 5,170,499
[45] Date of Patent: Dec. 8, 1992

[54] METHOD AND APPARATUS FOR ADJUSTING THE VOLUME LEVEL OF A RADIO

[75] Inventor: Timothy A. Grothause, Sunrise, Fla.

[73] Assignee: Motorola, Inc., Schaumburg, Ill.

[21] Appl. No.: 619,806

[22] Filed: Nov. 27, 1990

Related U.S. Application Data

[63] Continuation of Ser. No. 319,211, Mar. 6, 1989, abandoned.

[51] Int. Cl.[5] ............................................. H04B 7/005
[52] U.S. Cl. .................................. 455/238.1; 455/355; 381/57
[58] Field of Search .................. 455/238, 68, 69, 232, 455/234, 355, 33, 54, 56; 381/57, 104, 107, 105, 108; 379/60, 61

[56] References Cited

U.S. PATENT DOCUMENTS

| | | | |
|---|---|---|---|
| 2,671,849 | 3/1954 | Bartelink | 455/69 |
| 3,174,100 | 3/1985 | Orr, Jr. | 455/355 |
| 3,410,958 | 11/1968 | Cohen | 381/57 |
| 4,197,498 | 4/1980 | Fukui et al. | 455/77 |
| 4,254,303 | 3/1981 | Takizawa | 455/245 |
| 4,418,424 | 11/1983 | Kawamoto et al. | 455/355 |
| 4,477,809 | 10/1984 | Base | 455/54 |
| 4,904,992 | 2/1990 | Grothause | 340/825.44 |

FOREIGN PATENT DOCUMENTS 2266388 10/1975 France ................................. 455/355

Primary Examiner—Curtis Kuntz
Assistant Examiner—Edward Urban
Attorney, Agent, or Firm—Juliana Agon

[57] ABSTRACT

Radios (104) are commanded to determine the ambient sound level. A code representing the ambient sound level is transmitted to a calling radio (104c) or base unit 102, that determines whether to adjust the volume level (up or down) of the called radio (104a, 104b). In this way, messages will not be missed when the radio is used in a noisy environment, and messages will not be presented at an uncomfortable volume level when the radio is operating in a quite environment. In another embodiment, the called radio (104a, 104b) transmits whatever ambient sounds exists, and the ambient sound level is determined by the calling party (104c, 102).

12 Claims, 3 Drawing Sheets

METHOD AND APPARATUS FOR ADJUSTING THE VOLUME LEVEL OF A RADIO

This is a continuation of application Ser. No. 07/319,211, filed Mar. 6, 1989, and now abandoned.

TECHNICAL FIELD

This invention relates generally to two-way radio communication units, and more specifically to a method and apparatus for automatically adjusting the volume level of two-way radio communication units to compensate for varying ambient sound (noise) levels.

BACKGROUND ART

Portable radios are especially convenient in that they allow their users to remain in communication with others while roaming throughout a municipality, building or other facility provided with radio communication. Regrettably, many messages are missed by radio operators when they move into a high noise environment without adjusting the volume control (level) of their radios. In a high noise environment, the radio operators simply cannot hear the radio, and do not realize that they are being called. For example, an employee may customarily work in a quiet environment such as an administrative area. However, this employee may leave the administrative area to temporarily visit a manufacturing area to check on progress or resolve a problem. Unless the employee remembers to adjust the volume control (level) on his or her radio, messages may be missed while in the noisy manufacturing area. In the public safety markets, police or fire personnel have to work in both quiet and noisy environments. Depending upon the situation at hand, the firemen or officers may not appropriately adjust their radio volume as the ambient sound level varies. In extreme cases, some personnel may not respond to an emergency situation because they have not heard their radio.

Some radios have attempted to compensate for this detriment by including visual indicators that are illuminated when a call is received. However, this requires the operator to be attentive to the visual indication on the radio. In some situations, dividing the attention of a radio operator may be inappropriate or dangerous to the radio user or others. Accordingly, a need exists for a method to insure that the volume of a radio is adequately adjusted to facilitate communication.

SUMMARY OF THE INVENTION

Accordingly, it is an object of the present invention to automatically adjust the volume setting a radio to compensate for varying ambient sound (noise) levels thereby facilitating communication.

Briefly, according to the invention, radios are commanded to determine the ambient sound level and current volume setting. A code representing this information is transmitted to another radio (or base), that determines whether to adjust the volume level (up or down) of the called radio. In this way, messages will not be missed when the radio is used in a noisy environment, and messages will not be presented at an uncomfortable volume level when the radio is operating in a quite environment. In another embodiment, the called radio transmits whatever ambient sounds exists, and the ambient sound level is determined by the calling party.

DETAILED DESCRIPTION OF THE PREFERRED EMBODIMENT

Figure 1:
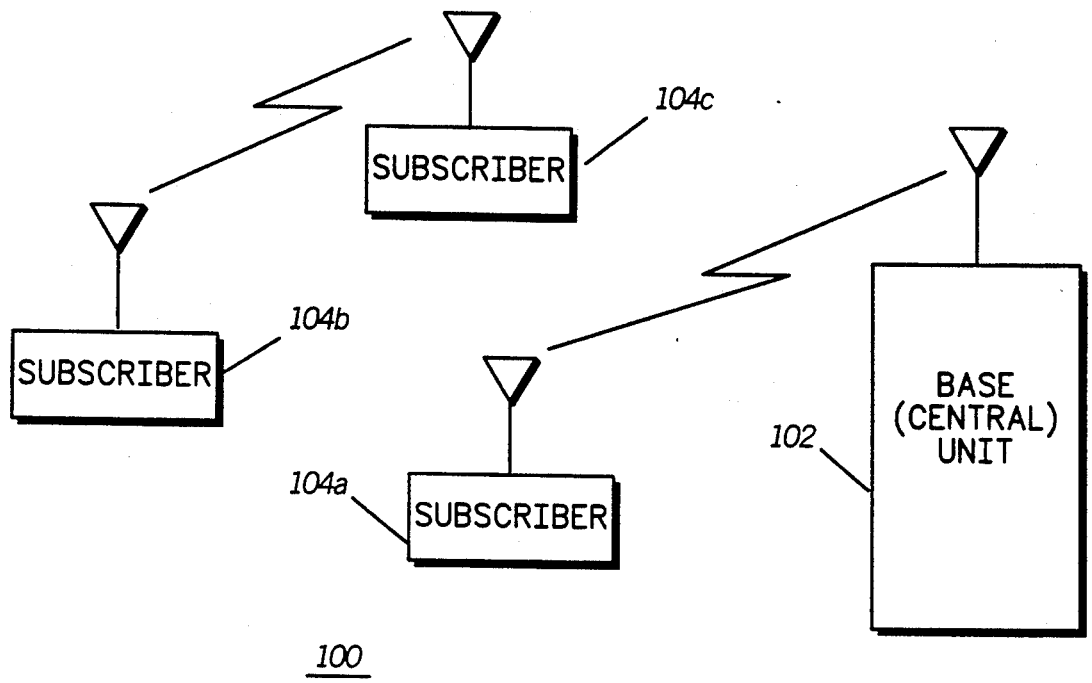
FIG. 1 is a block diagram of a communication system employing the present invention.

Referring to FIG. 1, a block diagram of a communication system 100 in accordance with the present invention is illustrated. A base (or central) unit 102 operating within the communication system 100 may communicate with a plurality of portable radios 104 (three shown) using any suitable communication protocol known in the art. Also portable-to-portable communication may take place as between radios 104b and 104c. According to the invention, the calling party (base unit 102 and radio 104c in the example of FIG. 1) first determines the ambient noise level of the called party (radios 104a and 104b respectively) before transmitting a voice message. As used herein, a radio's ambient sound level refers to all energy residing in the audio frequency band. Thus, ambient sound includes both intelligible voice signals, music, and audio tones as well as noise energy residing in the audible spectrum.

To determine the ambient sound level, the calling party sends a command signal to the called party, which instructs the called radio(s) to measure the ambient sound level. A code representing the ambient sound level and current volume setting is returned to the calling party, who determines whether the volume level of the called party should be adjusted (up or down) to provide an intelligible (but not excessively loud) voice message. Optionally, the calling party may simply command the called radio to "open" its microphone and transmit whatever ambient sounds are present; the burden of measuring the ambient sound level being shifted to the calling party. If the calling party determines that the called radio's volume should be adjusted, another command is transmitted before (or as part of) a voice message. In this way, the called party will hear a message in a noisy environment, without being startled by an excessively loud message when residing in a quiet environment.

Figure 2:
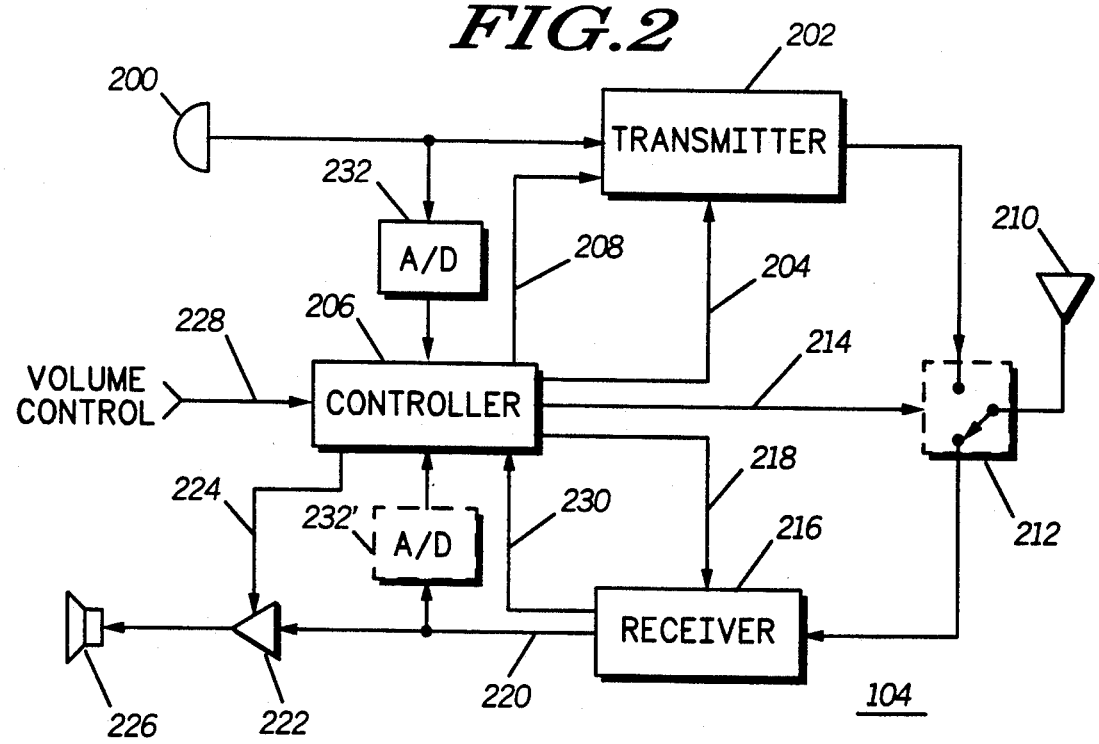
FIG. 2 is a block diagram of a subscriber unit of FIG. 1.

Referring to FIG. 2, a block diagram of a portable radio 104 is illustrated. A microphone 200 routes ambient sound (including desired voice messages) to a transmitter 202, which may be of conventional design and is controlled (activated)(204) by a controller 206. The transmitter 202 is selectively coupled to an antenna 210 by an antenna switch 212 that is also controlled by the controller 206. To measure the ambient sound level, audible energy (both noise and intelligible sounds) are digitized by an analog-to-digital (A/D) convertor 232 and processed by the controller 206. The controller 206 generates a code representing the ambient sound level and current volume setting (228), which is routed (208) to the transmitter 202 for transmission.

In the receive mode, the antenna 210 is coupled (via the antenna switch 212) to a conventional receiver 216, that provides as its output recovered data (230) and voice messages (220). Recovered data, for example, may comprise ambient sound and volume setting information that must be processed by the controller 206 to determine whether to increase or decrease the volume level of another radio. Optionally, the ambient sound level of another radio may be determined by commanding a called radio to transmit any ambient sounds that are received as a voice message. This voice message is digitized by optional A/D 232' and processed by the controller 206. Other voice messages may be presented (made audible) to the radio operator by the audio amplifier 222 and the speaker 226. The volume level of voice message presentation is ordinarily determined by a volume control setting 228, which is used by the controller 206 to control (224) the volume level of any audibilized message. According to the invention, however, this setting may be over-ridden to increase or decrease the volume level to present a message at an effective volume relative to the ambient sound level.

Figure 3:
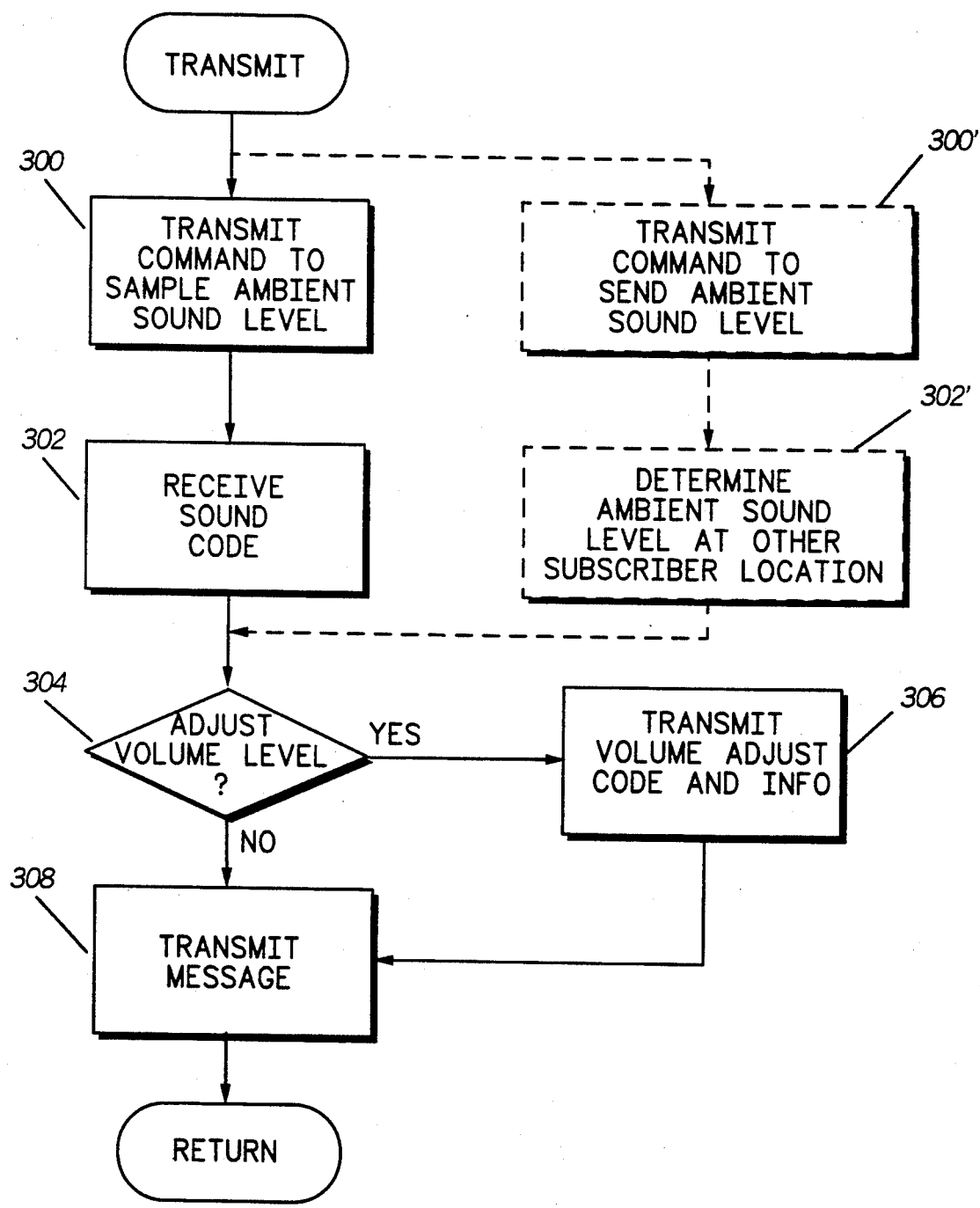
FIG. 3 is a flow diagram of the steps executed to transmit a message in accordance with the present invention.

Referring to FIG. 3, a flow diagram illustrates the step executed by a radio 104 (or 102) in the transmit mode (i.e., as a calling party). In step 300, a command is transmitted to a called radio instruction that radio to measure the ambient sound level and return an ambient sound level code (which may include the called radio's current volume setting). This code is received in step 302, after which a determination is made (decision 304) regarding whether the adjust to volume setting of the called party to provide an intelligible message. This determination may be made in a number of ways known in the art, such as, by comparing the ambient code level to one or more threshold values. Optionally, the called radio may be instructed to "open" its microphone and transmit whatever audible energy is present (300'). In this case, the ambient sound level at the called party's location is determined by the calling party in step 302'. Of course, in either embodiment, the calling party may determine whether to adjust the called party's volume setting without regard to the called party's current volume setting. Thus, by comparing the ambient sound level to one or more thresholds, the calling party can determine what the called party's volume setting should be and transmit that setting to the called party.

In any event, if decision 304 determines to adjust the called party's volume setting, a volume adjust command code is transmitted (step 306) that instructs the called party how much and in what direction (up or down) to adjust the volume value used by the controller to control the volume of a presented message. After this, a voice message (or mixed voice/data message) is transmitted in step 308. Naturally, if a decision 304 determines not to adjust the called radio's volume value, the routine proceeds directly to step 308 from decision 304.

Figure 4:
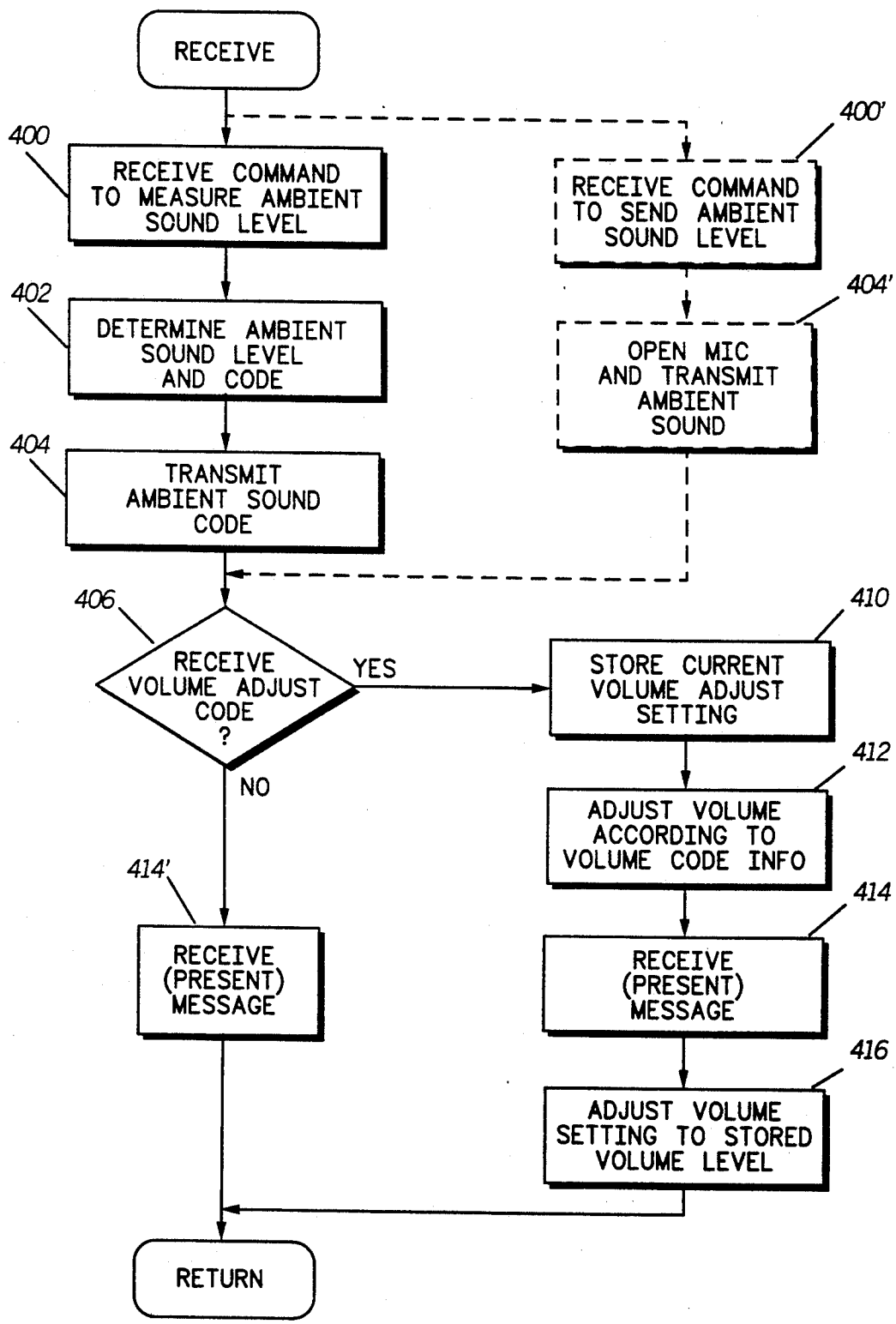
FIG. 4 is a flow diagram of the steps executed to receive a message in accordance with the present invention.

Referring to FIG. 4, a flow diagram illustrates the step executed by a radio 104 (or 102) in the receive mode (i.e., as a called party). The routine begins in step 400, where a command to determine the ambient sound level is received. Responsive to this command, the called radio digitizes (402) any ambient sound, which is processed by the controller 206 to generate the ambient sound level code which is returned to the calling party in step 404. Optionally, the called radio may receive a command to "open" its microphone (400') and transmit all ambient sounds to the calling party (step 404').

When a message is received, decision 406 determines whether a volume adjust code is included with the message. If so, the routine proceeds to step 410, where the current volume value (i.e., the volume value set by the radio operator via the volume control 228) is stored in electronic memory (preferably residing within the controller). Next, (step 412) the controller adjusts (224) the gain of the amplifier 222 to increase or decrease the volume of the remainder of the message (i.e., the voice portion of the message), which is presented to the operator in step 414. After presentation of the message, the controller recalls the original volume value from memory and restores the amplifier's (222) previous gain setting. In this way, the radio operator's desired volume setting is not lost by the temporary adjustments of the present invention. Optionally, steps 410 and 416 are omitted and the volume setting of the called party remains at the last setting commanded by the calling party. Of course, if decision 406 determines that the message does not contain a volume adjust command, the message is presented (step 414') at the operator's desired volume level.

What is claimed is:

1. A method for adjusting the volume setting of a two-way radio, comprising the steps of:
    (a) receiving from another two-way radio a first command to determine ambient sound level prior to receiving a message;
    (b) transmitting to said another two-way radio a radio frequency signal representing said ambient sound level in response to said first command;
    (c) receiving said message from said another two-way radio; and
    (d) adjusting a volume value above the ambient sound level when said message includes a second command from said another two-way radio to adjust said volume value, else presenting said message without adjusting said volume value.

2. The method of claim 1, wherein step (b) comprises the steps of:
    (b1) measuring said ambient sound level to produce a measured signal;
    (b2) processing at least said measured signal to provide said code representing said ambient sound level and a current volume value; and
    (b3) transmitting said code representing said ambient sound level and said current volume value.

3. The method of claim 1, wherein step (d) comprises the steps of:
    (d1) storing a current volume value to provide a stored volume value;
    (d2) adjusting said volume value to provide an adjusted volume setting;
    (d3) presenting at least a portion of said message at said adjusted volume setting; and
    (d4) restoring said volume to said stored volume value.

4. A method for adjusting the volume setting of a two-way radio having a volume value adjustable by a controller, comprising the steps of:
    (a) receiving from another two-way radio a signal representing a command to transmit ambient sounds prior to receiving a message;
    (b) transmitting to said another two-way radio said ambient sounds in a radio frequency signal in response to said command;
    (c) receiving said message from said another two-way radio; and
    (d) adjusting said volume value above the ambient sounds when said message includes a command from said another two-way radio to adjust said volume value by commanding said controller to adjust said value, else presenting said message without adjusting said volume value.

5. The method of claim 4, wherein step (d) comprises the steps of:
(d1) storing a current volume value to provide a stored volume value;
(d2) adjusting said volume value to provide an adjusted volume setting;
(d3) presenting at least a portion of said message at said adjusted volume setting; and
(d4) restoring said volume value to said stored volume value.

6. A method for adjusting the volume setting of a radio having a volume value adjustable by a controller, comprising the steps of:
at a first two-way radio:
(a) receiving a signal from a second two-way radio representing a first command to determine ambient sound level prior to receiving a message;
(b) transmitting to said second two-way radio a radio frequency signal representing said ambient sound level and a current volume value, said ambient sound level is determined by having audible energy digitized by an analog-to-digital convertor and processed by said controller in response to said command;
(c) receiving said message from said second two-way radio; and
(d) adjusting said volume value above the ambient sound level when said message includes a second command from said second two-way radio to adjust said volume value by commanding said controller to adjust said value, else presenting said message without adjusting said volume value;
at said second two-way radio;
(a) transmitting to said first two-way radio said first command to determine ambient sound level;
(b) receiving from said first two-way radio said signal representing said ambient sound level and said current volume value;
(c) processing said signal to determine whether to adjust said volume value by comparing said ambient sound level to one or more predetermined threshold levels; and
(d) transmitting said message to said first two-way radio, said message including said second command to adjust said volume value when step (c) determines to adjust said volume value.

7. A method for adjusting the volume setting of a two-way radio having a volume value adjustable by a controller, comprising the steps of:
at a first two-way radio:
receiving a voice signal from a second two-way radio, said voice signal being inadequately audible;
receiving a signal from said second two-way radio representing a command to transmit ambient sounds prior to receiving a message;
transmitting to said second two-way radio said ambient sounds in a radio frequency signal in response to said command;
receiving said message from said second two-way radio; and
adjusting said volume value above the ambient sounds when said message includes a command from said second two-way radio to adjust said volume value by commanding said controller to adjust said value, else presenting said message without adjusting said volume value;
at said second two-way radio;
transmitting said voice signal to said first two-way radio;
transmitting to said first two-way radio said signal representing said command to transmit ambient sounds;
receiving said ambient sounds from said first two-way radio;
processing said ambient sounds to provide an ambient sound level and to determine whether to adjust said volume value; and
transmitting said message to said first two-way radio, said message including said command to adjust said volume value when said processing step determines to adjust said volume.

8. A two-way radio, comprising:
means for receiving from another two-way radio a signal representing a first command to determine ambient sound level prior to receiving a message;
analog-to-digital convertor and controller means for determining said ambient sound level;
means for transmitting to said another two-way radio a radio frequency signal representing said ambient sound level in response to said command;
means for receiving said message from said another two-way radio; and
means for adjusting a volume value above the ambient sound level when said message includes a second command to adjust said volume value, else presenting said message without adjusting said volume value.

9. The radio of claim 8, wherein said means for transmitting comprises:
means for measuring said ambient sound level to provide a measured signal;
means for processing at least said measured signal to provide said code representing said ambient sound level and a current volume value; and
means for transmitting said code representing said ambient sound level.

10. The radio of claim 8, wherein said means for adjusting said volume value comprises:
means for storing a current volume value to provide a stored volume value;
means for adjusting said volume value to provide an adjusted volume setting;
means for presenting at least a portion of said message at said adjusted volume setting; and
means for restoring said volume value to said stored volume value.

11. A two-way radio having a volume value adjustable by a controller, comprising:
means for receiving from another two-way radio a signal representing a command to transmit ambient sounds prior to receiving a message;
means for transmitting to said another two-way radio said ambient sounds in a radio frequency signal in response to said command;
means for receiving said message from said another two-way radio; and
means for adjusting said volume value above the ambient sound level when said message includes a command to adjust said volume value by commanding said controller to adjust said value, else presenting said message without adjusting said volume value.

12. The radio of claim 11, wherein said means for adjusting said volume value comprises:

means for storing a current volume value to provide a stored volume value;

means for adjusting said volume value to provide an adjusted volume setting;

means for presenting at least a portion of said message at said adjusted volume setting; and means for restoring said volume value to said stored volume value.

* * * * *